R. E. MEYER.
VALVE FOR GAS ENGINES.
APPLICATION FILED JUNE 30, 1913.
1,188,297.
Patented June 20, 1916.
2 SHEETS—SHEET 2.
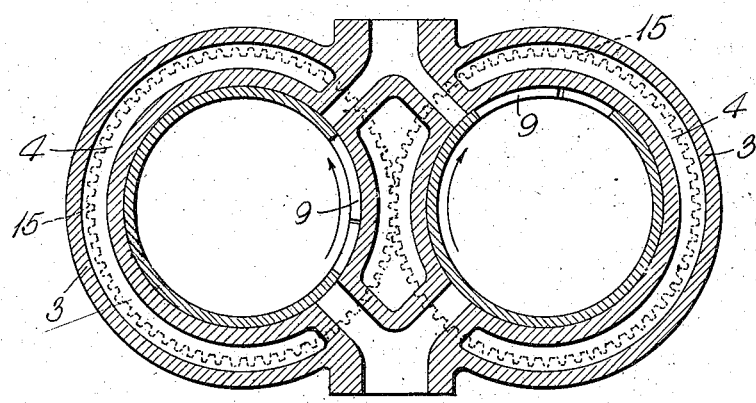
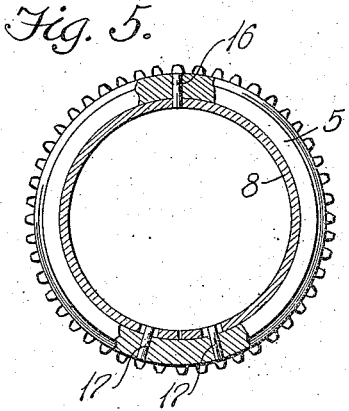
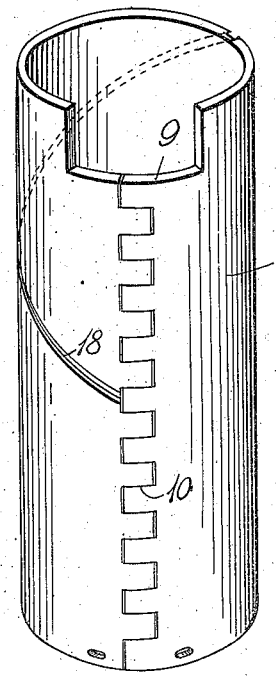
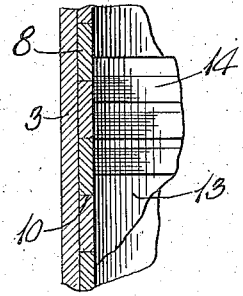
Inventor
Richard E. Meyer,
Witnesses

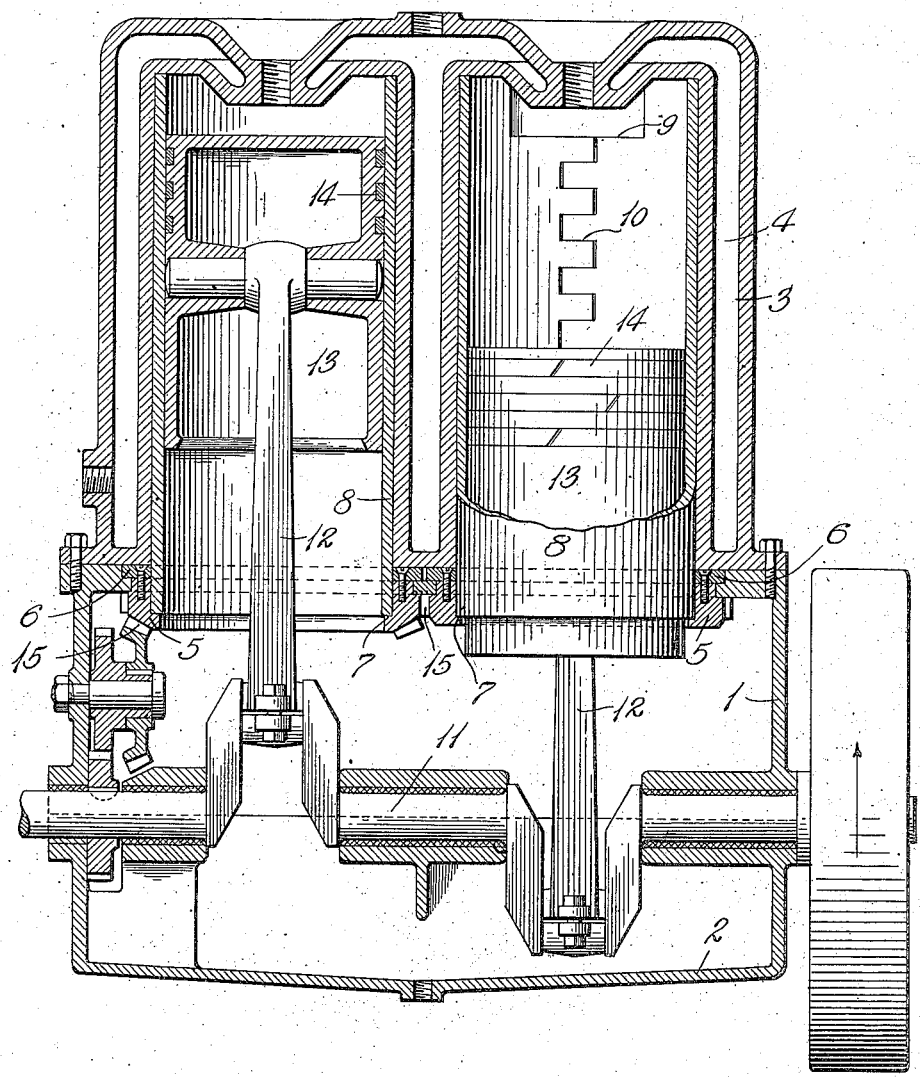

UNITED STATES PATENT OFFICE.

RICHARD E. MEYER, OF DETROIT, MICHIGAN.

VALVE FOR GAS-ENGINES.

1,188,297.  Specification of Letters Patent.  Patented June 20, 1916.

Application filed June 30, 1913. Serial No. 776,477.

*To all whom it may concern:*

Be it known that I, RICHARD E. MEYER, a citizen of the United States of America, residing at Detroit, in the county of Wayne and State of Michigan, have invented certain new and useful Improvements in Valves for Gas-Engines, of which the following is a specification, reference being had therein to the accompanying drawings.

This invention relates to valves for internal combustion or explosive engines, and to an arrangement thereof whereby the use of extra packing strips is avoided and whereby the valves in themselves are thoroughly cooled.

The invention consists in the matters hereinafter set forth and more particularly pointed out in the appended claims.

In the drawings, Figure 1 is a view in vertical section of a motor provided with valve gear that embodies features of the invention; Fig. 2 is a view in transverse section through the cylinders; Fig. 3 is a view in detail of a preferred form of valve closure; Fig. 4 is a view in detail of the closure and piston packing rings; and Fig. 5 is a view in section in detail, showing the attachment of the closure to a driving gear.

Referring to the drawings, an engine base 1 and crank case 2 of any suitable type, support cylinders 3 that are preferably disposed in pairs, although any arrangement that is desired may be used. The walls of the cylinders are provided with a water space 4 whereby they are efficiently cooled or water jacketed. An annular gear 5 is rotatably secured, as an overlying collar 6, to turn in axial alinement with a cylinder. An inner annular shoulder 7 of the gear 5 affords support for a valve sleeve 8 that has one or more port openings 9 disposed to register with the cylinder ports wherever they may be. The sleeve is divided longitudinally as indicated at 10 by a sinuous, broken or notched cut and is formed of such material that it tends to expand and closely fit the cylinder. The sleeve is proportioned to loosely seat on the annular shoulder 7 where it is secured by a pin 16 that is substantially diametrically opposite the line 10, and by other pins 17 that engage in slots which are elongated enough to permit expansion and contraction of the closure.

A main shaft 11 in the crank case and base is connected by piston rods 12 with pistons 13 that reciprocate in the sleeves 8. As the sleeves expand against the cylinder walls, packing rings 14 are necessary to insure fit between the piston and the sleeve. The rings are disposed so that one of them at least always overlaps a transverse portion of the line of division 10 of the closure. A suitable valve gear train, indicated at 15, or other like connection is used for rotating one of the closures 6. The closure of adjacent cylinders are interconnected to obtain the necessary synchronous movement of the valves. Lubrication is provided for by means of one or more spirally disposed channels 18 extending from the abutting margins of the closure to the upper end, so that lubricant is carried upwardly and distributed over the closure.

As the walls of the cylinders are water jacketed, the sleeves are cooled by contact therewith along the surfaces which need the most lubrication and as they expand readily throughout their length against the cylinder walls a sufficiently tight fit is insured to prevent appreciable leakage. The construction is simple, the valves are noiseless and their operation when once regulated is always in correct time with the engine cycle.

Obviously, changes in the details of construction may be made without departing from the spirit of my invention and I do not care to limit myself to any particular form or arrangement of parts.

What I claim is:—

1. In an explosive engine, a ported cylinder, an expansible split valve sleeve conformable to and rotatable in the cylinder for controlling the ports thereof, a piston for the cylinder reciprocable in the sleeve, and means rigidly connected to said sleeve intermediate the split edges thereof and loosely connected to said sleeve at the split edges thereof for rotating the sleeve in timed relation to the engine cycle.

2. The combination with an explosive engine and a ported cylinder thereof, of a valve sleeve rotatable in the cylinder split longitudinally to yieldingly expand against the cylinder walls, a piston reciprocable in the sleeve, and means rigidly connected to said sleeve intermediate the split edges thereof and loosely connected to said sleeve at the split edges thereof for turning the sleeve in timed relation to the piston movement to control the cylinder ports.

3. The combination in an explosive engine, of a ported cylinder, a gear rotatably mounted thereon, a yieldingly expansible valve sleeve connected to the gear to turn therewith and journaled in the cylinder to which it conforms, said valve sleeve having a split inter-locked portion and a lubricating groove extending from the upper end of said sleeve to a point intermediate the ends thereof and means for rotating the gear whereby the sleeve controls the cylinder ports.

4. The combination with an explosive engine having a ported cylinder, of a valve sleeve split longitudinally with the resultant abutting margins in interlocked engagement, means rigidly connected to said sleeve intermediate the split edges thereof and loosely connected to said sleeve at the split edges thereof to support the sleeve for rotation in the cylinder, and a piston for the cylinder reciprocable in the sleeve.

5. In an explosive engine, a ported cylinder, an expansible split valve sleeve having one or more ports and conformable to and rotatable in the cylinder for controlling the ports thereof, a piston for the cylinder reciprocable in the sleeve, and means rigidly connected to said sleeve intermediate the edges thereof and loosely connected to said sleeve and the split edges thereof for rotating the sleeve in timed relation to the engine cycle.

6. In an explosive engine, a ported cylinder, an expansible split valve sleeve conformable to and rotatable in the cylinder for controlling the ports thereof, a piston in the cylinder reciprocable in the sleeve, means rigidly connected to said sleeve intermediate the split edges thereof and loosely connected to said sleeve at the split edges thereof for rotating the sleeve in timed relation to the engine cycle, the sleeves being longitudinally split with the resultant margins in interlocking relation, and packing rings on the piston adapted to provide an overlap at all times and in all positions of the piston over the joints between the said margins.

7. In an explosive engine, a ported cylinder, an expansible split valve sleeve conformable to and rotatable in the cylinder for controlling the ports thereof, a piston in the cylinder reciprocable in the sleeve, means rigidly connected to said sleeve intermediate the split edges thereof and loosely connected to said sleeve at the split edges thereof for rotating the sleeve in timed relation to the engine cycle, the sleeves being longitudinally split with the resultant margins rectangularly notched and interlocked, and packing rings on the piston so disposed that one at least of them always overlaps a transverse portion of the interlocked seam.

In testimony whereof I affix my signature in presence of two witnesses.

RICHARD E. MEYER.

Witnesses:
C. R. STICKNEY,
S. E. McGRANN.